INVENTOR.
WILLIAM F. BRADLEY

BY Eldon H. Luther
ATTORNEY

INVENTOR.
WILLIAM F. BRADLEY

United States Patent Office 3,518,974
Patented July 7, 1970

---

3,518,974
DIGITAL FEEDWATER CONTROL SYSTEM
William F. Bradley, Thompsonville, Conn., assignor to Combustion Engineering, Inc., Windsor, Conn., a corporation of Delaware
Filed July 16, 1968, Ser. No. 745,169
Int. Cl. F22d *5/30*
U.S. Cl. 122—451  6 Claims

ABSTRACT OF THE DISCLOSURE

A direct digital control system for a steam generator wherein water level in the steam generating drum is regulated by feedwater control. The steam flow and steam generator water level are sensed by digital transducers generating a digital feedwater flow demand and level error summation signal, the steam flow signal being conditioned for density and square root corrections. This digital signal is used to actuate a plurality of parallel feedwater valves of different sizes, each of which is operative to an either fully opened or fully closed position, in various combinations to establish feedwater flow to maintain a desired water level in the drum of the steam generator.

---

BACKGROUND OF THE INVENTION

This invention relates to a process control arrangement for steam generators and more particularly to an all digital feedwater control system therefor.

Due to the ever-increasing complexity of the modern steam generating facility computers have recently been applied to directly regulate elements used in process control. These computers adjust optimum desired operating parameters through analog (proportional) transducers and controllers. Analog transducers and controllers, while directly resembling the physical phenomena with which they are associated, are not directly compatible with the digital computer systems necessary for the vast data storage required in process control, analog-to-digital converters of some complexity are required. Moreover, difficulties in signal handling, noise sensitivity, and precision may arise when using analog components.

SUMMARY OF THE INVENTION

My invention, which seeks to overcome these difficulties, includes a control system in which all elements are of the digital (pulse) type. This novel arrangement includes digital transducers to measure the control parameters, digital computer elements to receive and operate upon the measured digital signals from the transducers, and final control elements operative in direct response to digital inputs from the computer elements. This direct digital control system is particularly applied herein to regulate desired water level in a steam generator by means of feedwater control.

A differential pressure Δ/P transducer of the digital type senses the steam flow rate from the steam generator while a second digital transducer senses the water level in the steam generating drum. The digital pulse signal representing the steam flow rate is conditioned in a square root and density translator to yield an equivalent feedwater flow demand digital signal. After the digital water level signal is compared with the programmed desired water level at the specific steam flow rate generating a digital level error signal, this level error signal is combined with the conditioned digital steam flow rate signal to obtain a digital signal indicative of the total feedwater flow necessary to maintain the desired water level in the steam generating drum. This digital total feedwater flow demand signal controls the conditions of a plurality of different sized parallel feedwater valves of the fully opened/fully closed type. As the total digital feedwater flow demand signal changes, the feedwater flow will be controlled by the opening and closing of the feedwater valves in various combinations according to the digital signals received thereby.

DESCRIPTION OF THE PREFERRED EMBODIMENT

Figure 1:
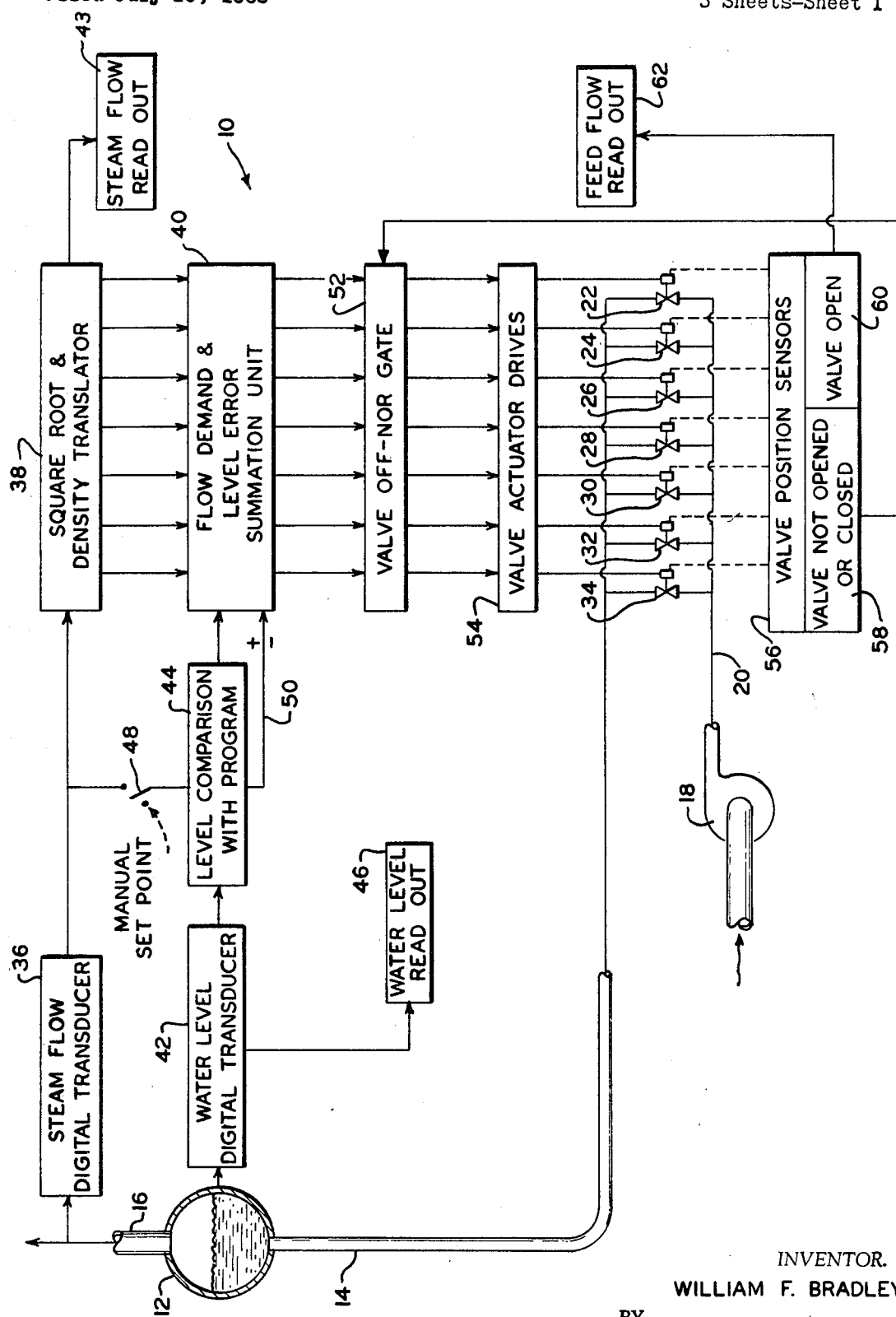
FIG. 1 is a schematic representation of a preferred arrangement of this invention.

Referring now to FIG. 1, numeral 10 designates the arrangement of the all digital control means for series of feedwater valves for regulating the desired level of water within the steam generating drum 12. The drum 12 has a feedwater inlet conduit 14 and a steam outlet conduit 16. Feedwater is supplied to the drum 12 from a suitable source by means of a pump 18 supplying water through conduit 20 to a series of different sized parallel feedwater valves (22, 24, 26, 28, 30, 32, 34) serving as a feedwater rate controller.

A steam flow digital transducer 36 senses the steam flow rate by measuring the pressure drop through a flow orifice in conduit 16 and directs a digital signal representative of the steam flow rate to a square root and density translator 38. The square root and density translator 38 conditions the signal received from the steam flow transducer for square root and density corrections, in a manner to be explained hereinbelow, and directs this signal to a flow demand and level error summation unit 40. A signal is also directed to a readout device 43 giving a visual indication of steam flow.

A water level digital transducer 42 detects the level of the water within the steam generating drum 12 and transmits a digital signal representative of the water level to a water level readout device 46. This signal is also transmitted to a level comparator 44. The comparator 44 derives a digital error signal indicating the deviation of the existing water level in the drum 12 from the desired water level for a particular steam flow. The required water level may be programmed by data dependent upon the steam flow digital transducer signal or from a manual set point signal for water level, as desired, by directing the switching means 48 accordingly. The comparator 44 will compute the difference between the sensed water level signal and the required water level signal and transmit the digital error signal derived to the flow demand and level error summation unit 40. The comparator 44 will also determine the direction of this error (i.e., plus or minus error) and send a signal through a control line 50 to indicate to the flow demand and level error summation unit 40 to add or subtract the digital level error signal.

The flow demand and level error summation unit 40 transmits a digital signal therefrom through valve OFF-NOR gate 52 to valve actuator drives 54. According to the digital signals received by the valve actuator drives 54, feedwater valves 22, 24, 26, 28, 30, 32, 34 will be actuated to respective fully opened or fully closed position to regulate the feedwater flow to the steam generator drum 12. A sensor means 56 senses the position of the feedwater valves. If a feedwater valve is not completely opened or closed (i.e., in a transition state between opened and closed), a portion 58 of the sensor means 56 will generate a signal which is fed back to the valve OFF-NOR gate 52.

This feedback signal is used to inhibit signals to the valve actuator drives 54 so that synchronism of changing signals and valve cycling can be maintained. In other words, each feedwater valve will be prevented from receiving a cycling signal different from an original signal sent thereto until all valves have reached their resepctive positions based on their original command signals. If a valve is sensed as open by the portion 60 of the sensing means 56, a signal will be sent to a readout device 62 to give an indication of feedwater flow.

Figure 2:
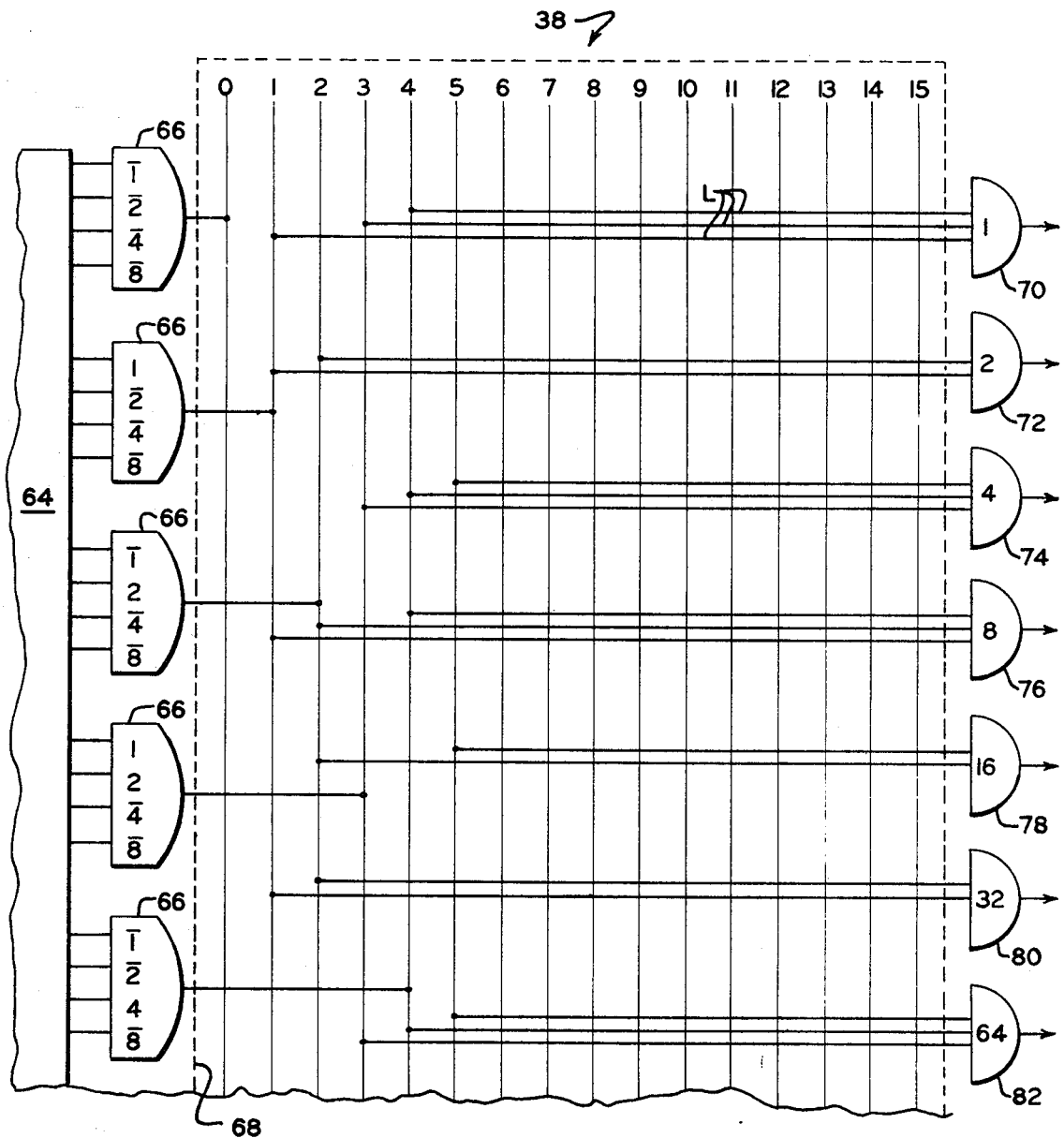
FIG. 2 is a schematic representation of the patch board connections of the square root and density translator.

For the particular example discussed herein, the steam flow digital transducer 36 is a four bit output transducer using a pure binary code. Other codes may, of course, be used to improve ambiguity problems in a practical system. A four bit transducer yields a resolution of 1/15; the sensed differential pressure ($\Delta/P$) will therefore be divided into fifteen discrete steps. A receiver 64 (FIG. 2) will receive a digital signal from the steam flow digital transducer 36 indicating a particular $\Delta/P$ step across a flow orifice in the steam flow conduit 16. The received logic signal will activate one of sixteen AND gates 66 (only five shown) respectively representing the fifteen $\Delta/P$ conditions and a "zero" $\Delta/P$ condition. Within the AND gates are shown the particular digital $\Delta/P$ unit which activates each. A bar (—) above a bit indicates and "off" condition thereof (e.g.,

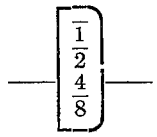

indicates a digital $\Delta/P$ signal of "four"). Each AND gate in turn activates on a patch board 68 a particular input line corresponding to its respective $\Delta/P$ representation for the purpose described hereinbelow. The AND gate representing "zero" $\Delta/P$ may be used to indicate no steam flow or for indication and control of a low range control unit, not illustrated.

The feedwater valves (22, 24, 26, 28, 30, 32, 34) have respective areas of opening which vary in accordance with a binary weight of flow (i.e., flow varies directly with binary signal). In the instant example a 15" ID feedwater supply line 20 was assumed with seven feedwater valves being used (resolution of 1/127). The sizes of the valves to allow binary weight of flow would then be as indicated in Table I.

TABLE I

| Valve No. | Digital logic | Valve ID (in.) |
|---|---|---|
| 22 | 1 | 1.33 |
| 24 | 2 | 1.875 |
| 26 | 4 | 2.66 |
| 28 | 8 | 3.75 |
| 30 | 16 | 5.33 |
| 32 | 32 | 7.5 |
| 34 | 64 | 10.6 |

It is understood, of course, that sizes given are illustrative only and in an actual application standard valve sizes, within a specified tolerance band, would be used. A particular desired feedwater flow then would be accomplished by using a combination of the feedwater valves having a digital output logic sum within the 1/127 resolution factor triggered by a particular digital $\Delta/P$ logic input indication.

Figure 3:
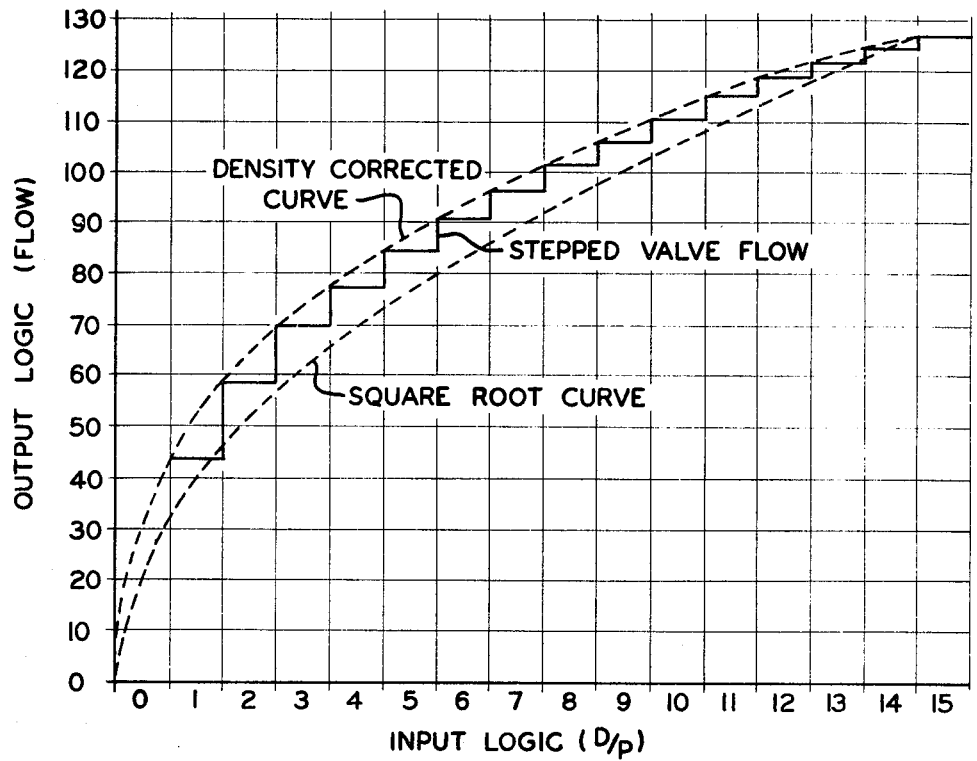
FIG. 3 is a graphical representation of the square root and density corrected flow functions plotted as output logic (desired feedwater flow) versus input logic Δ/P.

The relationship between the output logic representing flow and the input logic representing $\Delta/P$ is shown by the curves of FIG. 3. These curves were determined in the following manner: As is well known, fluid flow through in instrument flow nozzle produces a differential pressure. This flow is proportional to the square root of the differential pressure developed.

$$W = K\sqrt{\Delta/P} \qquad (1)$$

where:
W is mass flow (%)
K is a proportionality constant
$\Delta/P$ is the digital differential pressure unit
with the 1/15 resolution noted for the digital $\Delta/P$ steam flow transducer 36, at 100% flow:

$$K = \frac{W}{\sqrt{\Delta/P}}$$

$$K = \frac{100}{\sqrt{15}} = 25.8$$

Equation 1, when solved for W at the specific $\Delta/P$, will thus yield the values of Table II from which the Square Root curve of FIG. 3 is obtained.

TABLE II

| $\Delta/P$ | W (percent) | Output logic with 1/127 resolution (W ×127) |
|---|---|---|
| 0 | 0 | 0 |
| 1 | 26 | 33 |
| 2 | 36 | 46 |
| 3 | 45 | 51 |
| 4 | 52 | 66 |
| 5 | 58 | 73 |
| 6 | 63 | 80 |
| 7 | 68 | 87 |
| 8 | 73 | 93 |
| 9 | 78 | 98 |
| 10 | 82 | 104 |
| 11 | 86 | 109 |
| 12 | 90 | 114 |
| 13 | 93 | 118 |
| 14 | 97 | 123 |
| 15 | 100 | 127 |

A more rigorous derivation of Equation (1) shows that the relationship is also dependent on the density of the flowing fluid.

$$W = K_1\sqrt{\rho\Delta/P} \qquad (2)$$

where:
W is mass flow (%)
$K_1$ is a proportionality constant
$\rho$ is density (#/ft.$^3$)
$\Delta/P$ is the digital differential pressure unit under the particular conditions upon which this example is based, saturated steam supply pressure varies from 600 p.s.i.a. at 0% flow to 294 p.s.i.a. at 100% flow. The density at 600 p.s.i.a. is 1.30 #/ft.$^3$ while the density at 294 p.s.i.a. is 0.635 #/ft.$^3$. If it be considered that density and pressure changes are linear over the load range in question, the densities fo rcorresponding flow rates will be as shown in Table III.

TABLE III

| W(%): | $\rho$(#/ft.$^3$) |
|---|---|
| 0 | 1.300 |
| 10 | 1.233 |
| 20 | 1.167 |
| 30 | 1.100 |
| 40 | 1.034 |
| 50 | .967 |
| 60 | .901 |
| 70 | .834 |
| 80 | .768 |
| 90 | .701 |
| 100 | .635 |

Again, with the 1/15 resolution noted for the digital $\Delta/P$ steam flow transducer 36, at 100% flow:

$$K_1 = \frac{W}{\sqrt{\rho(\Delta P)}}$$

$$K_1 = \frac{100}{\sqrt{(0.635)(15)}} = \frac{100}{3.09} = 32.4$$

Equation 2, when solved for $\Delta/P$'s at specific W's and $\rho$'s will give the results shown in Table IV.

TABLE IV

| W(%): | Δ/P |
|---|---|
| 0 | 0 |
| 10 | 0.077 |
| 20 | 0.328 |
| 30 | 0.782 |
| 40 | 1.480 |
| 50 | 2.470 |
| 60 | 3.820 |
| 70 | 5.620 |
| 80 | 7.980 |
| 90 | 11.00 |
| 100 | 15.00 |

A curve of W(%) v. Δ/P (not shown) may readily be obtained from Table IV from which Table V and the Density Corrected Curve of FIG. 3 may be established.

TABLE V

| Δ/P | W (percent) | Output logic with 1/127 resolution (W ×127) |
|---|---|---|
| 0 | 0 | 0 |
| 1 | 34.0 | 43 |
| 2 | 45.5 | 58 |
| 3 | 54.0 | 69 |
| 4 | 60.5 | 77 |
| 5 | 66.4 | 84 |
| 6 | 71.5 | 91 |
| 7 | 76.0 | 97 |
| 8 | 80.0 | 102 |
| 9 | 84.0 | 107 |
| 10 | 87.0 | 111 |
| 11 | 90.0 | 115 |
| 12 | 93 | 118 |
| 13 | 95.5 | 121 |
| 14 | 97.8 | 124 |
| 15 | 100 | 127 |

From the above derivation, it may readily be seen how the output logic from the patch board 68 may be utilized to control the feedwater valves (22, 24, 26, 28, 30, 32, 34) to obtain proper feedwater flow conditions, thus maintaining the feedwater flow equal to the existing steam flow so as to keep a desired water level in the steam generator drum 12 upon specific digital differential pressure input logic signals thereto. The OR gates 70, 72, 74, 76 78, 80, 82 send output logic signals (through the summation unit 40 and the intermediate signal refining means) to the respective valve actuators in order to actuate the valves to their respective proper condition (opened or closed) according to the input logic signal received from the steam flow digital transducer 36. Each OR gate has specific leads (for simplicity only a few thereof are shown for each gate) connected thereto from selected input lines on the patch board 68 (e.g., lines L to OR gate 70). These leads are connected so that upon activation of an input line by an AND gate signaling a specific digital differential pressure unit, those leads will receive a signal which activate respective OR gates having an output logic summation particular to the signaled differential pressure. Restated, the intermediate digital computer elements (square root and density translator 38, and summation unit 40) serve as coupling means to couple the digital steam flow rate signal (and water level error signal) to the digitally actuated feedwater control valves to maintain a desired water level in the steam generating drum 12. As an illustrative example, if the steam flow digital transducer 36 transmits a digital input logic signal of a differential pressure of "four" units, this digital signal is received by receiver 64 and transmitted through the appropriate AND gate to the input line #4. This signal activates OR gates 70, 74, 76, and 82 whose sum output logic is "seventy-seven," and develops a corresponding feedwater flow by opening valve 22, 26, 28 and 34, providing there is no change in the signal by the summation unit 40 (indicating a water level error signal form comparitor 44) or the valve OFF-NOR gate 52 (indicating that the particular valves have not finished responding to a previous signal).

Figure 4:
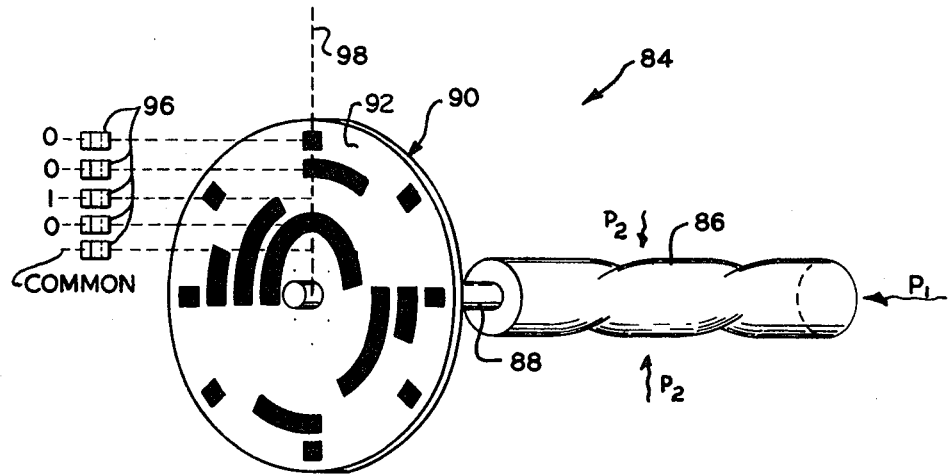
FIG. 4 is a Δ/P digital transducer which may be used with the arrangement of this invention.

FIG. 4 shows a digital output transducer which may be used as a steam flow digital transducer to give a digital indication of differential pressure. One pressure $P_1$ enters the open end of the twisted tube 86 while the second pressure $P_2$ envelopes the outside of the tube 86, pressure $P_1$ and $P_2$ being, for example, the differential pressures existing on opposite sides of a flow measuring orifice. As the pressure difference between $P_1$ and $P_2$ increases, the tube will untwist in a well-known manner similar to Bordon tube. The untwisting of tube 86 results in the rotation of a shaft 88 fixed to the closed end of tube 86. Fixed to rotate with shaft 88 is a disk 90. The disk 90 has on its face a conducting surface (light area) and a nonconducting surface (dark area). The nonconducting surface is specifically arranged about the face of the disk so as to leave the conducting surface in the form of a pure binary code of four bits with the outermost track 92 being the least significant digit. Brush pickups 96 observe a reading line 98 cutting the disk 90. As the disk rotates beneath the reading line 98 due to the pressure in the tube 86, brushes 96 will pick up a digital signal representative of that specific unit of pressure differential between the outside pressure and the pressure within the tube. In the partcular position shown, the binary reading is 0100 (plus a common pickup signal which is used to give an indication of proper brush functioning). Transposed into the number system to the base 10 with which one is most familiar, the above binary reading is equivalent to the number four.

With the above complete digital system, there are a number of specific advantages over the prior combined analog-digital systems. Accuracy is improved due to the fact that drift from original alignment, as would be common in analog equipment, is eliminated. The system performs by means of binary (on-off) signals so it will operate without any error or it will not operate at all. While a source of error may be found if a mechanical linkage from the pressure sensing device to the steam flow digital transducer is used, standard reliable linear linkages may be employed. This is possible due to the fact that density and square root compensation is accomplished in the system design and not in the transducer per se.

Reliability of digital control elements has reached a 1-to-10 failure rate in a billion device-hours of operation. This has been accomplished with the advance of solid state technology. Moreover, due to the elimination of the necessary equipment for analog control functions, there are less components in an all digital control system. Furthermore, digital logic techniques are easier to understand for maintenance and operation.

An all digital control system also represents an economy factor in that digital logic elements are available in standard modular form that can be used in the design of the system described hereinabove. Standard purchasing procedures can be practiced for replacement and spare parts inventory. Space requirements for such components are reduced on the order of 10 to 1. Additionally, the feedwater valves require less precision and engineering design than analog control valves for similar operation. The valves in the instant system need only be fast acting fully opened/fully closed steady state valves.

While I have illustrated and described a preferred embodiment of my invention, it is to be understood that such is merely illustrative and not restrictive and that variations and modifications may be made therein without departing from the spirit and scope of the invention. I therefore do not wish to be limited to precise details set forth but desire to avail myself of such changes as fall within the purview of my invention.

I claim:
1. A feedwater control system for a steam generator organization having a steam generating drum, a feedwater supply means for supplying feedwater to the steam generating drum and a steam outlet therefrom, said control system comprising: a first digital transducer means connected to said steam outlet sensing steam flow rate therein for producing a digital steam flow rate signal, a second digital transducer means connected to said steam generating drum measuring water level therein for producing a digital water level signal, a water level comparator means, means for transmitting said water level signal to said water level comparator means in order for said water level comparator to compute a digital water level error signal, a feedwater rate control system including selectively actuable digital flow regulating means connected to said feedwater supply means, a coupling means for coupling said digital steam flow rate signal and said digital water level error signal to said feedwater rate control system as a digital signal input thereto, said feedwater rate control system being actuated to vary the flow of feedwater from the feedwater supply means to the steam generating drum in response to variation in said digital signal input to said control system.

2. Apparatus of claim 1 wherein said digital flow regulating means includes a plurality of different sized parallel feed water valves of the fully opened/fully closed type and digitaly responsive actuators therefor, said actuators varying the flow of feedwater from the feedwater supply means by opening or closing said feedwater valves in various combinations according to said varying digital signal inputs thereto.

3. Apparatus of claim 1 wheerin said coupling means comprise a square root and density translator translating said digital steam flow rate signal into a corrected digital feedwater flow demand signal, and a summation means receiving and summing said corrected digital feedwater flow demand signal and said digital water level error signal from said feedwater level comparator means to produce said digital signal input, representative of said total feedwater demand, to said feedwater rate control system.

4. Apparatus of claim 3 wherein said coupling means further includes a signal inhibitor means for selectively inhibiting said produced digital signal input to said feedwater rate control system so that variations in said signal input to said feedwater rate control system do not occur until any previous variation occurring in said feedwater supply means, as directed by said feedwater rate control system, is accomplished.

5. A method for controlling a steam generator organization having a feedwater supply means for a steam generating drum with a steam outlet, including a plurality of different sized parallel feedwater valves comprising the steps of: sensing the rate of steam flow, generating a first digital signal indicating the sensed rate of steam flow, sensing the water level in the steam generating drum, generating a second digital signal indicating the sensed water level in the steam generating drum, combining said first and second digital signals to generate a third digital signal indicating the total feedwater flow demand, using said third digital signal to control the supply of feedwater from said feedwater supply means by opening and closing a particular combination of valves of said plurality of different sized parallel feedwater valves to establish the total feedwater flow demand as indicated by said third digital signal, and varying the combination of open and closed parallel feedwater valves upon change in feedwater flow demand as indicated by change in said third digital signal.

6. The method of claim 5 wherein the steps of generating said third digital signal includes the steps of applying a square root and density correction to said first digital steam flow rate signal, comparing said second digital water level signal with a programmed water level signal to derive a water level error signal, and summing the said corrected first digital signal and said water level error signal.

References Cited

UNITED STATES PATENTS 3,042,007    7/1962    Chien et al. _____ 122—448

FOREIGN PATENTS 893,251    4/1962    Great Britain.

OTHER REFERENCES

Power, N. Y.: McGraw-Hill, May 1959, vol. 103, No. 5, pp. 64 and 65 TAIP8 copy in 122/1.

KENNETH W. SPRAGUE, Primary Examiner

PO-1050
(5/69)

UNITED STATES PATENT OFFICE
CERTIFICATE OF CORRECTION

Patent No. 3,518,974            Dated July 7, 1970

Inventor(s) William F. Bradley

It is certified that error appears in the above-identified patent and that said Letters Patent are hereby corrected as shown below:

Column 2, line 13, of the patent, change "$\Delta$/P" to --($\Delta$/P)--;

Column 4, line 3, of the patent, change "$\Delta$/P" to --($\Delta$/P)--;

Column 4, line 5, of the patent, insert --(1)--;

Column 4, line 11, of the patent, change "$\Delta$/P" to --$\Delta$/P's--;

Column 4, line 18, of the patent, change "&/P" to -- $\Delta$/P--;

Column 5, line 71, of the patent, change "form" to --from--; and

Column 7, line 25, of the patent, change "wheerin" to --wherein--.

SIGNED AND
SEALED
DEC 29 1970

(SEAL)
Attest:

Edward M. Fletcher, Jr.
Attesting Officer

WILLIAM A. SCHUYLER, JR.
Commissioner of Patents